United States Patent [19]

Bookbinder

[11] Patent Number: 4,550,305
[45] Date of Patent: Oct. 29, 1985

[54] PULSATING LAMP SYSTEM FOR VEHICLES

[76] Inventor: David Bookbinder, 448 E. Annette Dr., Phoenix, Ariz. 85022

[21] Appl. No.: 568,049

[22] Filed: Jan. 4, 1984

[51] Int. Cl.[4] .............................................. B62J 5/00
[52] U.S. Cl. ..................... 340/134; 340/72; 340/74
[58] Field of Search ............... 340/81 R, 77, 72, 134, 340/71, 80; 180/282; 192/0.042, 0.049, 0.094

[56] References Cited

U.S. PATENT DOCUMENTS

| | | | |
|---|---|---|---|
| 3,710,315 | 1/1973 | Scherenberg | 340/71 |
| 3,875,560 | 4/1975 | Williams | 340/80 |
| 3,916,377 | 10/1975 | Demeter | 340/72 |
| 4,127,844 | 11/1978 | Purdy | 340/81 R |

*Primary Examiner*—John W. Caldwell, Sr.
*Assistant Examiner*—Jeffery A. Brier
*Attorney, Agent, or Firm*—Don J. Flickinger

[57] ABSTRACT

A pulsating lighting signal for use on a motorcycle includes front and rear strobe lamps powered by a headlight strobe circuit and a taillight strobe circuit, respectively. The trigger signal from the headlight strobe circuit is coupled through a manual switch to the front strobe lamp and therefore may be rendered operational by the driver at will. The trigger signal generated by the taillight strobe circuit must pass through a clutch relay which will pass the signal when the clutch is engaged and a throttle limit switch which is closed when the throttle is closed. This throttle limit switch may also be bypassed by a manual switch at the driver's discretion. A clutch limit switch controls the clutch relay and is mounted on the vehicle's clutch linkage. Similarly, the throttle limit switch is mounted on the vehicle's throttle linkage. Finally, the trigger signal generated by the taillight strobe circuit is also applied to a brake relay, which has as an input thereof a signal from the vehicle's braking system. Thus, when the brakes are applied, the brake relay will allow the trigger signal to pass therethrough to the taillight strobe lamp.

12 Claims, 1 Drawing Figure

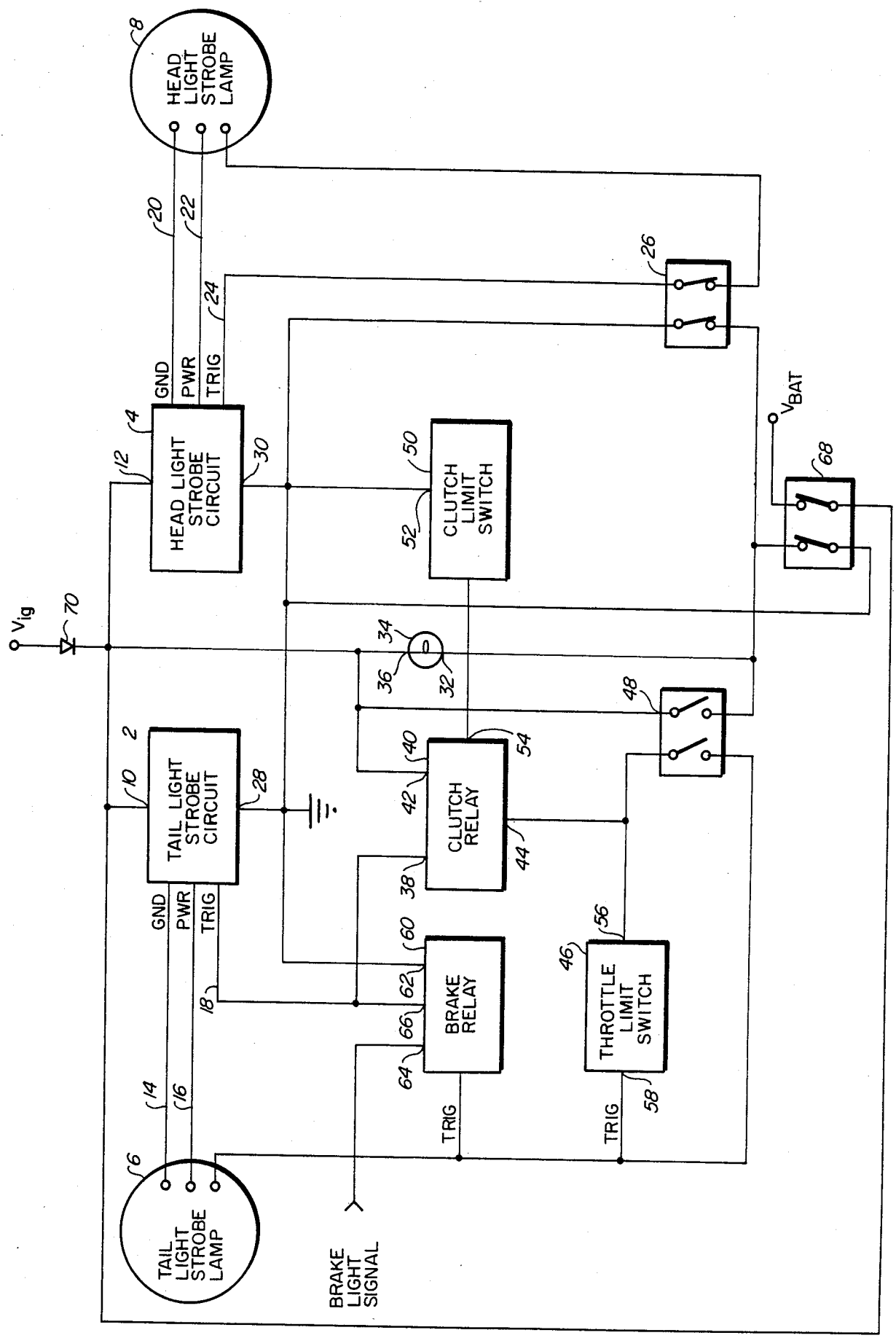

PULSATING LAMP SYSTEM FOR VEHICLES

BACKGROUND

1. Field of the Invention

This invention relates generally to a lighting system for vehicles and, more particularily, to a pulsating lamp system for use on a motorcycle to render it more visible and more easily detected during both daylight and evening operation.

2. Prior Art

It is well known that small vehicles, particularily motorcycles, are involved in many accidents causing serious injury and sometimes death to the operator simply because of the difficulty which automobile and truck drivers have in recognizing the presence of such small vehicles on roads and highways.

Even though the prior art is replete with various vehicular lighting systems which flash or give indications of a vehicles acceleration and deceleration, some of which utilize multi-intensity lamps, nowhere is there discribed a suitable system for use in conjunction with the lighting system on a motorcycle which will accomodate the various modes of motorcycle operation.

One known system utilizes a strobe light mounted on a pole which is in turn coupled to the motorcycle. The strobe light emits periodic brilliant flashes of light when the road lamps of the motorcycle are energized. Unfortunately, this system operates (i.e. emits brilliant flashes) irrespective of whether the motorcycle is accelerating, decelerating, or in the process of shifting gears (i.e. whether or not the vehicle's clutch is engaged or disengaged).

SUMMARY OF THE INVENTION

It is an object of the present invention to provide an improved vehicular lighting system.

It is a further object of the present invention to provide an improved lighting system for use on motorcycles.

It is a still further object of the present invention to provide an improved lighting system for use on motorcycles including strobe lamps which are visible from both the front and rear of the motorcycle so as to render the motorcycle more visible during both daylight and evening operation.

It is another object of the present invention to provide an improved lighting system for use on motorcycles including a taillight strobe lamp which emits brilliant flashes of light when the motorcycle's throttle is closed.

A still further object of the present invention is to provide an improved lighting system for motorcycles which includes a taillight strobe lamp which emits brilliant flashes of light when the motorcycle's throttle is closed and the clutch is engaged.

It is a further object of the present invention to provide an improved lighting system for use on motorcycles including a headlight strobe lamp and a taillight strobe lamp which may be manually activated.

A still further object of the present invention is to provide an improved lighting system for use on motorcycles including a taillight strobe lamp which emits brilliant flashes of light when the motorcycle's brake is applied.

A still further object of the present invention is to provide an improved lighting system for use on motorcycles which includes an emergency power supply.

Yet another object of the present invention is to provide an improved lighting system for use on motorcycles which includes an indicator lamp which, when lit, signifies that the lighting system is operational.

According to a broad aspect of the invention there is provided a lighting system for use on a vehicle such as a motorcycle of the type which includes a throttle which when closed reduces the amount of fuel being consumed so as to achieve deceleration, a clutch which when disengaged disconnects the vehicles engine from its transmission, a braking system for stopping the vehicle, and a source of electrical energy which is activated by the vehicles ignition system.

A first strobe lamp is coupled within or proximate the headlamp of the motorcycle and means are coupled to this first strobe lamp and to the source of electrical energy for providing a first electrical pulsating trigger signal thereto.

A second strobe lamp is coupled within or proximate the motorcycle's taillight, and second means are coupled between the second strobe lamp and the source of electrical energy for supplying a second electrical pulsating trigger signal thereto. This second means includes a relay which passes the trigger signal if the vehicles clutch is engaged.

A throttle limit switch is coupled between the output of the relay and the trigger input of the taillight strobe lamp so as to pass the trigger signal only if the motorcycle's throttle is closed. Switch means are provided to bypass this throttle switch and supply the trigger signal to the taillight strobe lamp irrespective of the condition of the throttle. A second relay is provided which passes the trigger signal therethrough to the taillight strobe lamp whenever the vehicle's brakes are applied.

BRIEF DESCRIPTION OF THE DRAWINGS

The above and other objects, features and advantages of the present invention will be more clearly understood from the following detailed description taken in conjunction with the accompanying drawing which is a block diagram of the inventive vehicular lighting system.

DESCRIPTION OF THE PREFERRED IMBODIMENT

Referring to the drawing, there is shown a taillight strobe circuit 2 and a headlight strobe circuit 4 which activate taillight strobe lamp 6 and headlight strobe lamp 8 in a manner to be described herein below. As can be seen, both the taillight strobe circuit 2 and headlight strobe circuit 4 are coupled to a source of supply voltage Vig which is generated when the vehicle's ignition is turned on. This supply voltage is applied to inputs 10 and 12 of strobe circuits 2 and 4 respectively. Taillight strobe circuit 2 supplies a ground signal, a power signal (approximately 100 volts) and a trigger signal over lines 14, 16 and 18, respectively. The ground and power signals are supplied directly to taillight strobe lamp 6, via lines 14 and 16. The trigger signal is supplied to taillight strobe lamp 6 via circuitry to be described.

Similarly, headlight strobe circuit 4 supplies ground and power (approximately 200 volts) signals directly to headlight strobe lamp 8 over lines 20 and 22, respectively. Headlight strobe circuit 4 also supplies a trigger signal on line 24 which is applied to headlight strobe lamp 8 via double-pole, single throw switch 26. Taillight strobe lamp 6 and the headlight strobe lamp 8 may be located within the existing taillight and headlight structures, respectively, or may be positioned proximate thereto. As can be seen ground is applied to both the taillight strobe circuits and headlight strobe circuits 2 and 4, respectively, at inputs 28 and 30, respectively.

It is important to note that the circuitry which may be used in the taillight strobe circuit 2 and headlight strobe circuit 4 for driving a strobe lamp (i.e. supplying ground, power and trigger signals thereto) is well known. For example, such circuitry in lamps may be purchased from Tomar Electronics, Tempe, Ariz., bearing model numbers 470 (12 volts) or TE14J. These strobe lamp assemblies may be adjusted to generate a trigger signal and therefore emit a brilliant flash of light at any desired repetion rate, for example, once or twice per second. Each flash is of extremely high intensity, typically 500,000 candle power.

In order to render the head lamp strobe light functional, it is only necessary to close switch 26. In this manner, the trigger signal appearing on line 24 will be appearing on line 24 will be applied through switch 26 to headlight strobe lamp 8. Additionally, ground potential will be coupled through switch 26 to a first terminal 32 of lamp 34, which has a second terminal 36 coupled to potential Vig. Thus, lamp 34 will ignite indicating that headlight strobe lamp 8 has been rendered operational. Switch 26 may be nothing more than a manual switch mounted on the handle bars of the motorcycle (e.g. an SPDT 275-662 available from Tandy Corp.).

The trigger signal, being generated by taillight strobe circuit 2 and applied on line 18, is applied to a first input 38 of clutch relay 40 (e.g. a Magnecroft W. 2.50×2). Clutch relay 40 is also coupled at input 42 to Vig and has an output 44, which is applied to a throttle limit switch 46 (e.g. a Micro Switch V3-343-D8) and to a first terminal of double-pole, single throw switch 48 (e.g. a Tandy SPDT 275-662). A clutch limit switch 50 (e.g. a Micro Switch V3-343-D8), having a first input 52 coupled to ground, is mounted on the clutch linkage such that it closes when the clutch is disengaged. When clutch limit switch 50 closes, a ground potential is supplied therethrough to input 54 of clutch relay 40 to open the relay. Therefore, as long as the vehicles clutch is engaged, clutch limit switch 50 will remain open causing clutch relay to remain closed and the trigger signal appearing on line 18 from taillight circuit 2, will pass through clutch relay 40 to throttle limit switch 46 and switch 48.

A second limit switch, throttle limit switch 46, is coupled to the motorcycle's throttle linkage and closes when the throttle closes. Therefore, when the throttle closes (e.g. prior to braking) throttle limit switch 46 will also close conducting the trigger signal appearing at its input 56 to its output 58 and therefore to the taillight strobe lamp 6. When throttle limit switch 46 is open, the trigger signal cannot pass therethrough. This function, however, can be overridden by closing switch 48. If switch 48 is closed, the trigger signal will pass therethrough to taillight strobe lamp 6. Additionally, with switch 48 closed, a ground potential will be supplied to input 32 of lamp 34 causing it to light. As with the case with switch 26, switch 48 may be a manual switch mounted proximate the handle bars of the motorcycle.

What has been described thus far is a system wherein a strobe lamp located in or near the motorcycle taillight assembly begins to emit brilliant flashes of light whenever the throttle is closed, such as during deceleration preparatory to stopping and the clutch is engaged. Disengaging the clutch (e.g. when shifting gears) will block the trigger signal since the motorcycle may, in fact, be accelerating and not decelerating.

When stopping the vehicle, the throttle may be closed, but the clutch will be disengaged thus preventing the trigger signal from reaching taillight strobe lamp 6. To correct this, a second relay, brake relay 60 is provided which has a first input 62 coupled to ground, a second input 64 coupled to the motorcycle's brake system (in particular, the signal which causes the brake light to go on), and a third input 66 coupled to the trigger signal being produced by taillight strobe circuit 2 over line 18. Thus, when the brakes are being applied, brake relay 60 (e.g. a Magnecraft W. 2.50×2) will pass the trigger signal therethrough to taillight strobe lamp 6 irrespective of whether the vehicles clutch is engaged or disengaged.

It should be apparent that the system described thus far is dependant for its energization on supply voltage Vig which is available when the vehicles ignition has been turned on. An emergency source of power (Vbat) such as would be available from an onboard battery, may also be provided so as to permit the strobe system to operate when the ignition is off. Attention is drawn to double-pole, single throw switch 68, which when closed supplies a battery voltage Vbat over the same lines which distribute Vig to the components of the system. Diode means 70 has been provided to prevent Vbat from being applied back through the vehicle's ignition system.

Additionally, when switch 68 is closed, a ground potential is coupled to input 32 of lamp 34 igniting it. As was the case with switches 26 and 48, switch 68 may be a manual switch positioned proximate the handle bars of the motorcycle.

Thus, there has been described a lighting system for use on motorcycles which utilizes strobe lamps so as to render the motorcycle more visible during both day time and evening operation. The system takes into consideration the various operating modes of the motorcycles so as not to confuse the drivers of automobiles or trucks in the immediate vicinity of the motorcycles. The strobe lights emit brilliant flashes periodically that instantly register upon the minds of drivers of automobiles and trucks and instantly draws the attention of the drivers of such automobiles and trucks to its presence at a distance far enough removed to give the driver ample time to move with caution and avoid any confrontation.

The above description is given by way of example only. Changes in form and details may be made by one skilled in the art without departing from the scope of the invention as defined by the appended claim. For example, while the inventive lighting system has been described in terms of limit switches, manual switches and relays, it should be clear that such an arrange may be implemented using solid state devices and technology.

I claim:

1. A lighting system for use on a motorcycle of the type which includes a throttle which when closed reduces the amount of fuel being consumed, a clutch which when disengaged disconnects the motorcycle's engine from its transmission, a breaking system for stopping said motorcycle, and a first source of electrical energy activated by the motorcycle's ignition, said lighting system comprising:

a first strobe lamp visible from the front of said motorcycle;

a second strobe lamp visible from the rear of said motorcycle;

first means coupled to said first strobe lamp and to said first source for supplying a first electrical pulsating trigger signal to said first strobe lamp, said first means including a first source of said first trigger signal, and first switch means coupled between said first source of said first trigger signal and said first strobe lamp for conducting said first trigger signal to said first strobe lamp when said first switch means is in a first state; and second means coupled to said second strobe lamp and to said first source for supplying a second electrical pulsating trigger signal to said second strobe lamp, said second means including a second source of said second trigger signal, and second switch means coupled between said second source and said second strobe lamp for conducting said second trigger signal when said second switch means is in a first state.

2. A lighting system according to claim 1 wherein said first switch means is a first manually operable switch.

3. A lighting system according to claim 1 wherein said second means further comprises third switch means coupled between said second switch means and said second strobe lamp for conducting said second trigger signal to said second strobe lamp when said third switch means is in a first state.

4. A lighting system according to claim 3 wherein said third switch means is a second manually operable switch.

5. A lighting system according to claim 1 wherein said second switch means comprises:

first limit switch means coupled to said clutch for assuming a first position when said clutch is engaged; and fourth switch means coupled between said second source of said second trigger signal and responsive to said first limit switch for conducting said second trigger signal when said first limit switch is in said first state.

6. A lighting system according to claim 5 wherein said fourth switch means is a first relay.

7. A lighting system according to claim 5 wherein said second means further comprises:

second limit switch means coupled to said throttle for assuming a first position when said throttle is closed, said second limit switch coupled between said fourth switch means and said second strobe lamp for conducting said second trigger signal from said fourth switch means to said second strobe lamp.

8. A lighting system according to claim 7 wherein said second means further comprises fifth switch means coupled between said second source and said second strobe lamp and responsive to said braking system for conducting said second trigger to said second strobe lamp when the braking system is activated.

9. A lighting system according to claim 8 wherein said fifth switch means is a second relay.

10. A lighting system according to claim 8 further comprising a second source of electrical energy which may be activated independently of said ignition.

11. A lighting system according to claim 10 further comprising indicator means for indicating when either of said first or second strobe lamps are being energized.

12. A lighting system according to claim 11 wherein said indicator means is a lamp.

* * * * *